United States Patent [19]
Campbell

[11] Patent Number: 6,094,827
[45] Date of Patent: Aug. 1, 2000

[54] VIEWING WINDOW LOCKOUT MECHANISM FOR POWER TOOL

[75] Inventor: David C. Campbell, Bel Air, Md.

[73] Assignee: Black & Decker, Inc., Newark, Del.

[21] Appl. No.: 09/256,607

[22] Filed: Feb. 23, 1999

[51] Int. Cl.$^7$ .................................................. B23D 47/00
[52] U.S. Cl. .................................. 30/390; 30/391; 83/520
[58] Field of Search ............................. 30/388–391, 373; 83/520, 478, 544, 860, DIG. 1

[56] References Cited

U.S. PATENT DOCUMENTS

| | | |
|---|---|---|
| 1,922,676 | 8/1933 | Greene . |
| 2,296,175 | 9/1942 | Morkoski . |
| 2,368,775 | 2/1945 | Perret . |
| 3,570,043 | 3/1971 | Knudson . |
| 3,841,518 | 10/1974 | Hines . |
| 4,450,627 | 5/1984 | Morimoto . |
| 5,794,351 | 8/1998 | Campbell et al. ......................... 30/390 |
| 5,794,482 | 1/1999 | Campbell et al. ......................... 30/390 |
| 5,822,864 | 10/1998 | Campbell et al. . |

FOREIGN PATENT DOCUMENTS

| | | |
|---|---|---|
| 31 04 340 C2 | 2/1982 | Germany . |
| 33 45 335 A1 | 6/1985 | Germany . |
| 85 17 523 | 10/1986 | Germany . |
| 196 02 440 A1 | 8/1996 | Germany . |

*Primary Examiner*—Douglas D. Watts
*Attorney, Agent, or Firm*—Shook, Hardy & Bacon L.L.P.

[57] ABSTRACT

A power tool has a body with a motor disposed therein. The motor has a saw blade coupled therewith. A guard covers at least a portion of the saw blade. A window is pivotally mounted to the guard and movable between an open position and a closed position. The window has an abutment surface. A deformable elongated member has a first end fixed to the guard and a second end that is free to move with respect to the first end due to the deformable nature of the elongated member. The elongated member has a first position wherein the second end rests adjacent the abutment surface to prevent opening of the window. The deformable member is in a generally linear configuration when in its first position such that attempted opening forces are transferred along the axis of the elongated member. Said elongated member also has a second position wherein the member is deformed by an operator so that the first abutment surface and the second end are no longer adjacent one another, and wherein the window can be moved to an open position.

17 Claims, 3 Drawing Sheets

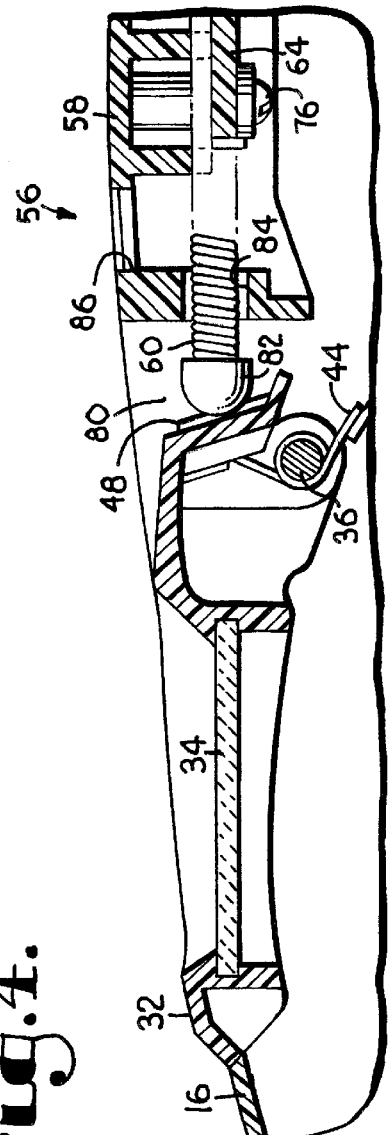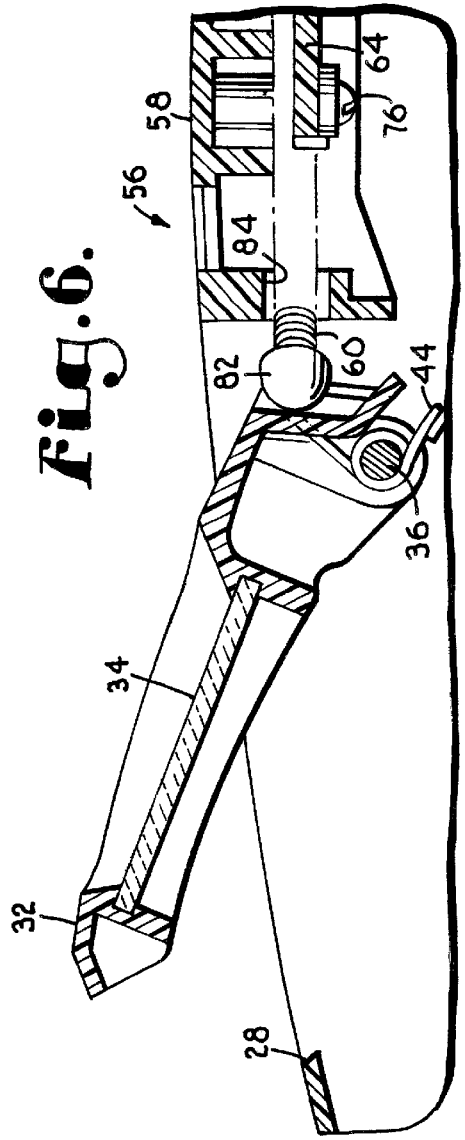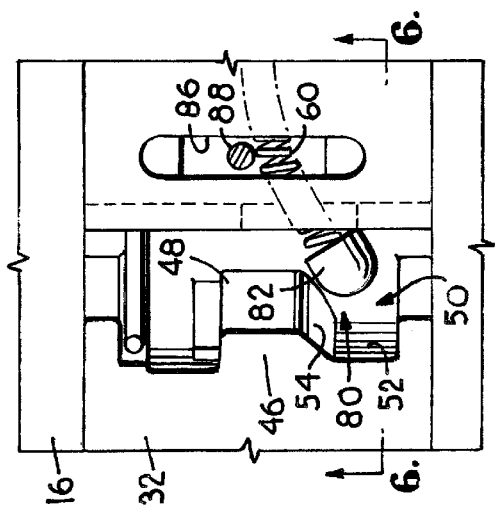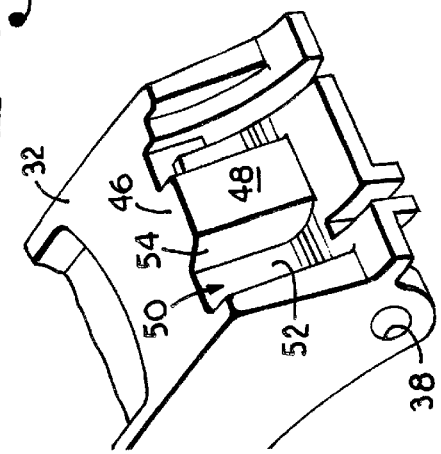

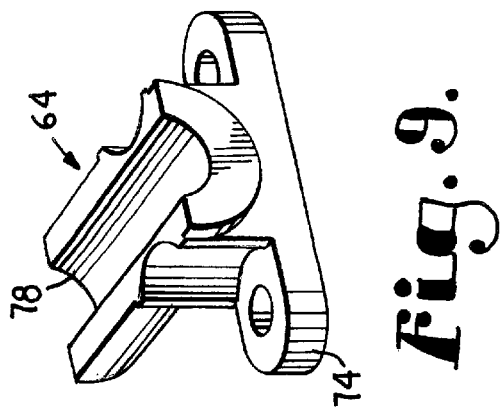
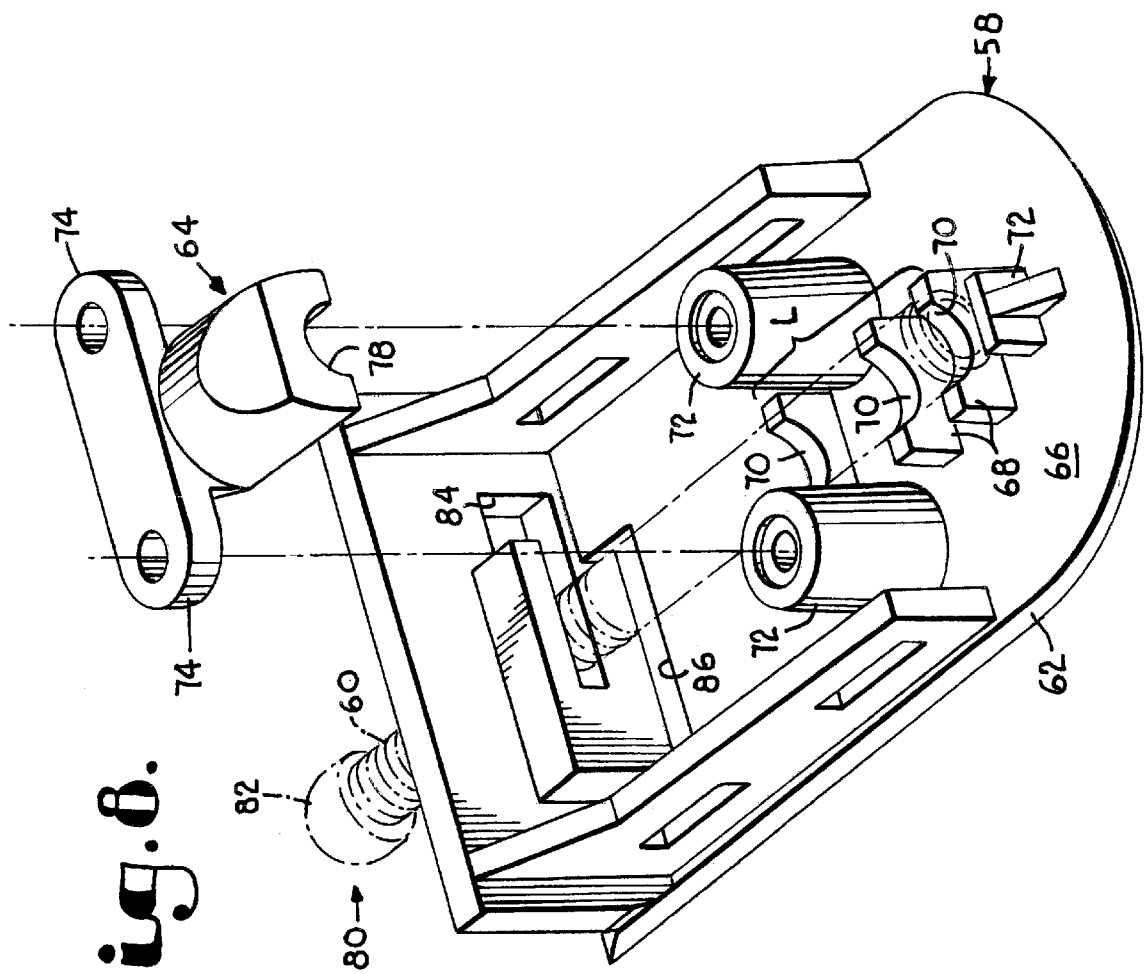

VIEWING WINDOW LOCKOUT MECHANISM FOR POWER TOOL

FIELD OF INVENTION

This invention relates to the field of power tools, and, more particularly, to a window that allows viewing of a cutting tool of the power tool and that is capable of being locked in a closed position.

BACKGROUND OF THE INVENTION

Hand-held power tools, such as circular saws, have been popular woodworking tools for many years. In a typical power tool operation, such as a sawing operation, the user begins by marking or otherwise identifying a desired line along which to saw the material to be cut. The user then guides the saw during cutting, manually aligning the blade with the desired line of cut. Maintaining this alignment manually can be difficult because the typical circular saw has a blade guard that obscures the user's view of the blade at the point of cutting, and thus impedes the user's ability to accurately align the blade with the desired cutting line.

To overcome this difficulty, one alternative has been to provide the circular saw with a guide slot. Typically located on the base of the saw, the guide slot is so aligned ahead of the blade in the forward cutting direction to provide a visual indication of the anticipated blade path through the workpiece. During operation, the user typically positions the saw so that the guide slot and thus the blade are aligned with the line of cut. This approach can provide a satisfactory cut, unless the saw blade is improperly aligned with the guide slot. A blade is typically oriented at a predesignated location on an arbor driven by the saw motor. Deviations from this orientation can occur causing misalignment between the blade and the guide slot. The guide slot will then incorrectly indicate the blade path, and the user relying on the guide slot will be less likely to cut the material as desired. Furthermore, since the blade is covered by the saw guard, the user cannot directly monitor the blade travel, and, therefore, may not detect the misalignment until substantial cutting has occurred. As a result, the workpiece may be ruined.

To overcome these limitations, another alternative has been to supply the saw guard with a transparent viewing window covering an aperture in the saw guard. Such a window enables direct observation of the saw blade as it enters the workpiece, which in turn enables the user to better maintain a desired cutting path. An extremely successful window can be found in U.S. Pat. No. 5,822,864, which is hereby incorporated herein by reference. This patent discloses a viewing window for covering an aperture in the guard of a hand-held circular saw. The window is movable between a closed position, wherein the window substantially covers the aperture, and an open position, wherein the window at least partially uncovers the aperture. The ability to at least partially uncover the aperture allows cleaning of the interior surface of the window if such interior surface becomes fouled by sawdust. This patent also provides for a structure to bias the window to a closed position.

It may be desirable in certain circumstances to provide a structure to lock the window in its closed position.

SUMMARY OF THE INVENTION

Accordingly, it is an object of the present invention to provide a viewing window in a power tool which is capable of being locked in its closed position.

It is a further object of the present invention to provide a locking mechanism which can be easily actuated by the saw operator.

It is a still further object of this invention to provide a locking mechanism that can be disposed easily within the saw guard structure of the power tool.

Another object of the present invention is to provide a locking mechanism which has a minimal number of parts and is easily assembled.

An additional object of the present invention is to provide a locking mechanism wherein the locking mechanism automatically returns to its locked position when the viewing window returns to its closed position.

Accordingly, the present invention provides for a power tool having a body with a motor disposed therein. The motor has a cutting tool coupled therewith. A guard covers at least a portion of the cutting tool. A window is disposed on the guard and allows an operator to view the cutting tool. The window also has an abutment surface. A deformable elongated member has a first end fixed to the body and a second end that is free to move with respect to the first end due to the deformable nature of the elongated member. The elongated member has a first position wherein the second end is disposed adjacent the window abutment surface to prevent opening of the window. The elongated member is generally linear in configuration when in its first position, such that attempted opening forces are transferred along the axis of the elongated member. The elongated member also has a second position wherein the elongated member is deformed by an operator so that the abutment surface and the second end of the elongated member no longer are located adjacent one another so that the window can be moved to an open position.

Additional objects, advantages, and novel features of the invention will be set forth in part in a description which follows, and in part will become apparent to those skilled in the art upon examination of the following, or may be learned by practice of the invention.

BRIEF DESCRIPTION OF THE DRAWINGS

In the accompanying drawings which form a part of this specification and are to be read in conjunction therewith and in which like reference numerals are used to indicate like parts in the various views:

FIG. 4 is an enlarged fragmentary view similar to FIG. 3 showing the coilspring of the lockout member actuated to a position to allow opening of the window assembly;

FIG. 5 is a cross-sectional view taken generally along line 5—5 of FIG. 3 showing the lockout mechanism in its locked position and the window assembly in its closed position;

FIG. 6 is a cross-sectional view taken generally along line 6—6 of FIG. 4 showing the lockout mechanism in its unlocked position and the window assembly in its open position;

FIG. 7 is a fragmentary perspective view of the rear portion of the window assembly showing the structures utilized to lock the window in its closed position;

FIG. 8 is an inverted exploded perspective view of the lockout mechanism prior to it being attached to the guard of the circular saw and showing the affixing of the coilspring member to the lockout mechanism; and FIG. 9 is a bottom perspective view of the attaching bracket shown in FIG. 8 used to attach and affix the coilspring to the lockout mechanism.

DETAILED DESCRIPTION OF THE PREFERRED EMBODIMENTS

Figure 1:
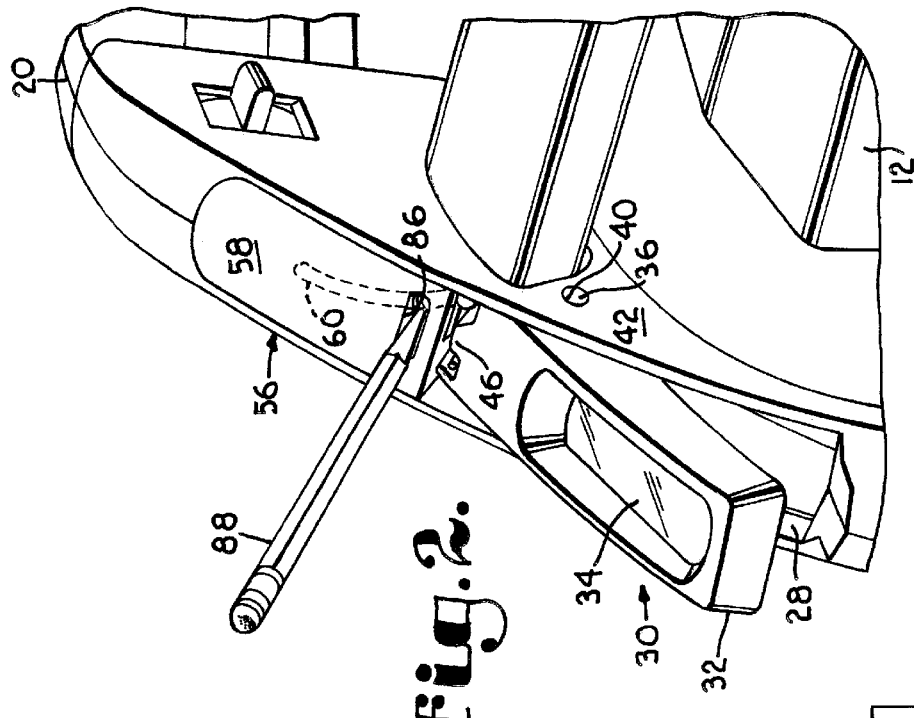
FIG. 1 is a front perspective view of a circular saw having the window lockout mechanism of the present invention, with the window in its locked position.
Figure 2:
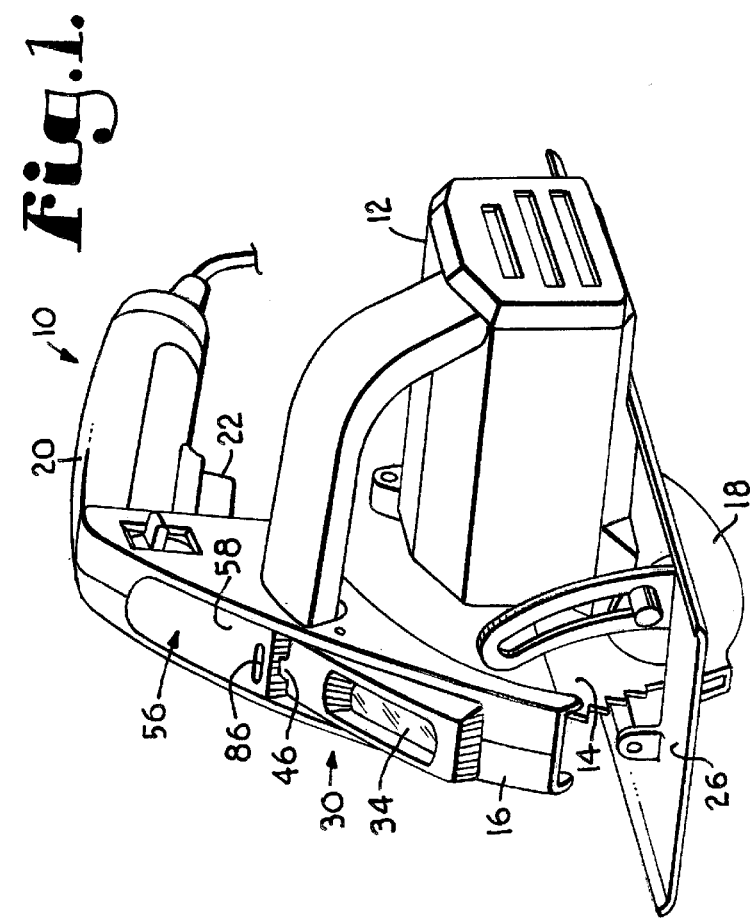
FIG. 2 is an enlarged view similar to FIG. 1 showing the lockout mechanism being actuated by a pencil and the window assembly in its open position.
Figure 3:
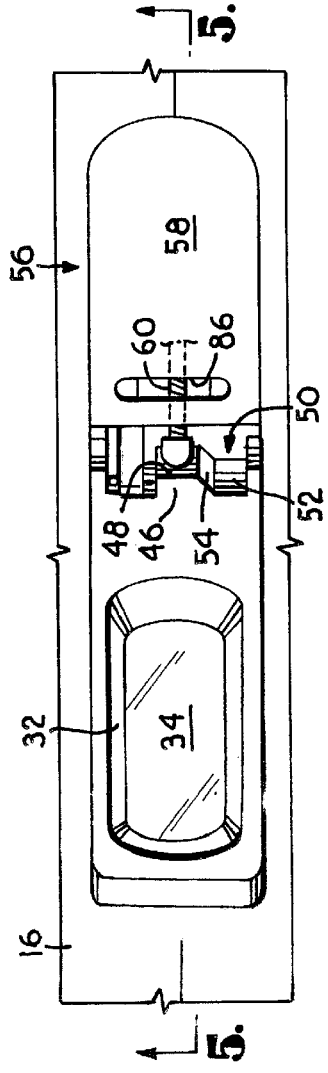
FIG. 3 is a top plan view of the lockout mechanism, with the lockout mechanism in its locked position to prevent opening of the window assembly.

Referring to the drawings in greater detail, and initially to FIGS. 1–3, a power saw designated generally by the numeral 10 is shown. Saw 10 has an outer shell or body 12 in which is disposed an electrical motor. The motor can be powered either by a power cord or an appropriate battery pack (not shown). A circular saw blade 14 is operably attached to the motor so that powering of the motor results in rotation of blade 14. Blade 14 is generally surrounded by an upper stationary guard 16 and a lower movable guard 18. Guard 18 exposes the lower portion of blade 14 in a manner that is well-known in the art. More specifically, the front edge of guard 18 engages the leading edge of the workpiece. As the saw passes further into the workpiece, guard 18 is rotated generally upwardly to expose the lower portion of the blade. Guard 18 is spring-loaded so that when the saw is disengaged from the workpiece, guard 18 returns to its lower covering position.

Saw 10 further includes a trigger handle 20. Handle 20 has a switch 22 mounted thereon for operation by the saw user. A generally planar base or shoe 26 is attached to shell 12. Shoe 26 has a lower surface which rests on the upper surface of the workpiece as the saw passes therethrough and is used to gauge the depth to which blade 14 cuts.

With reference to FIGS. 2–4, and 6, guard 16 has an aperture 28 formed therein which allows viewing of blade 14 as it travels through a workpiece. A window assembly 30 is provided for covering and uncovering aperture 28, as will be more fully described below. Assembly 30 includes a frame 32 and an optically transmissive window 34 coupled therewith. Although window 34 is depicted as a generally planar rectangular structure in the drawings, window 34 can be of any suitable shape and curvature. Window assembly 30 is pivotally coupled to stationary guard 16 through a pivot pin 36. More specifically, pin 36 extends through aligned apertures 38 in frame 32 (as best shown in FIG. 7), and through corresponding aligned apertures 40 in sidewalls 42 of guard 16 (as best shown in FIG. 2). Therefore, pivoting of frame 32 about pin 36 results in uncovering and recovering aperture 28. A torsion spring 44 is provided about pivot pin 36 for biasing assembly 30 to its closed position. More specifically, opening of window assembly 30 by an operator results in additional tensioning of spring 44. Thus, when an operator removes opening force from window assembly 30, window assembly 30 will automatically return to its closed position.

Disposed on a rearward end of frame 32 is a locking projection 46, as best shown in FIG. 7. Locking projection 46 has an abutment surface 48 which will be used in conjunction with other structures to lock window assembly 30 into its closed position, as will be more fully described below. Disposed adjacent one side of projection 46 is a relief area 50. Relief area 50 also operates in conjunction with other structures to allow opening of window assembly 30. Extending between surface 52 of relief area 50 and abutment surface 48 is a generally slanted camming surface 54. Camming surface 54 assists the automatic locking function of window assembly 30, as will be more fully described below.

With reference to FIGS. 3, 4, 8 and 9, guard 16 also has a locking arrangement 56 associated therewith. Locking arrangement 56 is in the form of a shroud piece 58 which is rigidly connected to guard 16 by any suitable means, such as adhesive, heat bonding, or any sort of snapping structure. Shroud 58 has rigidly secured thereto a tightly wound coilspring 60. More specifically, a length L of coilspring 60 is rigidly secured to shroud 58 below an upper surface 62 of shroud 58 via use of a clamping bracket 64, as best shown in FIG. 8. A lower surface 66 of shroud 58 has raised coilspring supports 68 associated therewith. Supports 68 have semicircular apertures 70 which serve to support half of spring 60. Lower surface 66 also has an end abutting member 72 associated therewith to prevent axial movement of spring 60. A pair of attaching bosses 72 also extend downwardly from surface 66, and have suitable screw holes disposed therein. Bracket 64 has a pair of attaching ears 74 with apertures therein which align with the apertures in boss 72. Screws or rivets 76 can be used to attach bracket 64 to shroud 58, as best shown in FIGS. 4 and 6. Bracket 64 further has a semicircular channel 78 which conforms to one side of coilspring 60. Thus, coilspring 60 can be fixably held along length L by the attachment of bracket 64 to shroud 58 in a pinching manner. Apertures 70 and channel 78 serve to support spring 60 along length L in a fixed manner, and serve to squeeze it tightly so that spring 60 is virtually immobilized along length L. Although coilspring 60 is disclosed as being fixedly held to shroud 58 by a clamping structure, any other suitable affixing arrangement can be utilized, for instance, a suitable adhesive, a snap molding feature in the shroud, or in situ molding of the length L of spring 60.

Spring 60 has a free end 80 which can be moved with respect to the fixed portion L of coilspring 60. More specifically, the coiled nature of spring 60 allows deflection of the length of spring 60 that is not fixedly attached to shroud 58. End 80 has a plastic plug 82 associated therewith which engages abutment surface 48 of window assembly 30 to prevent the opening action of assembly 30, as best shown in FIGS. 3 and 4. More specifically, as a saw operator attempts to open assembly 30 by gripping the side edges of frame 32, such upward movement will result in surface 48 contacting plug 82. In this manner, the attempted opening force applied to assembly 30 will be transferred along the axis of coilspring 60. Because it is transferred along the axis of coilspring 60, coilspring 60 will act essentially as a rigid element, thus preventing rotation of window assembly 30. Therefore, rotation of window assembly 30 to an open position will be prevented.

Coilspring 60 is limited to deflection in one direction by a guide slot 84. More specifically, slot 84 extends in one direction generally from the center of shroud 58. When coilspring 60 is in its nondeflected position which operates to lock window assembly 30 in place, one side of coilspring 60 will be adjacent an end surface slot 84. Slot 84 extends only in one direction, as best shown in FIG. 8, and thus confines deformation of coilspring 60 to one direction.

As best shown in FIGS. 3 and 8, in addition to guide slot 84, shroud 58 has actuating slot 86. In particular, actuating slot 86 allows access to an intermediate portion of coilspring 60 which allows the operator to deflect coilspring 60 within slot 84 by use of a pencil or other elongated tool, as best shown in FIGS. 2, 4, and 6. More specifically, in order to deflect coilspring 60 away from its longitudinally aligned position, an operator simply sticks the point of a pencil or other elongated instrument within slot 86 and against the side of spring 60 which is opposite guide slot 84. An operator then simply pries over on coilspring 60 so that spring 60 deflects within slot 84 and free end 80 moves away from abutment surface 48, as best shown in FIG. 4.

FIGS. 3 and 5 show window assembly 30 in its closed lock position. More specifically, free end 80, and, in particular, plug 82, is located adjacent abutment surface 48. If an operator attempts to open window assembly 30 by pulling upwardly on frame 32, upward rotation is prevented by the contacting of abutment surface 48 and plug 82. Any upwardly opening force is transmitted along the longitudinal axis of spring 60 such that coilspring 60 actually acts as a solid member and prevents rotation.

In order to open window assembly 30, an operator must first insert a pencil 88 or other elongated member into actuating slot 86 and deflect spring 60 within guide slot 84 so that it no longer is aligned with abutment surface 48, as is shown in FIGS. 2, 4, and 6. As coilspring 60 is deflected, an operator can then pull up on window assembly 30. Relief area 50 allows upward rotation of window assembly 30 to an open position to allow cleaning of the interior surface of the window. Once window assembly 30 has been rotated at sufficient distance upwardly, the deflecting force put on spring 60 by an operator can be released such that plug 82 will abut against camming surface 54. Camming surface 54 will thus prevent plug 82, and thus spring 60, from returning to its locked position and allow further rotation upwardly of window assembly 30.

In order to return window assembly 30 to its closed lock position, an operator simply lets go of assembly 30 which results in assembly 30 returning to its closed position due to the bias of spring 44. At the same time this closing action is occurring, plug 82 of coilspring 60 rides along camming surface 54 until it returns to its position in alignment with abutment surface 48. As is apparent, coilspring 60, due to its nature, has a resting configuration that is a linear cylinder and attempts to return to that resting configuration from a deflected configuration. Therefore, coilspring 60 is automatically returned to its locked position via the use of camming surface 54.

As is apparent, locking arrangement 56 offers a convenient structure to lock window assembly 30 in its closed position. An operator can simply actuate spring 60 and thereafter open assembly 30. Upon release of assembly 30, it automatically returns to its closed locked position, due to torsion spring 44 and the internal bias of coilspring 60. Additionally, arrangement 56 only has one moving part, that is, coilspring 60. Still further, arrangement 56 fits sleekly within guide 16 so as to not affect the overall appearance of the circular saw , As is apparent, arrangement 56 is easily constructed of substantially standard parts and is well-suited to meet the objectives of this invention.

From the foregoing, it will be seen that this invention is one well-adapted to attain the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

I claim:

1. A power tool comprising:
    a motor adapted to drive a cutting tool;
    a guard covering at least a portion of the cutting tool;
    a window pivotally mounted on said guard and allowing an operator to view the cutting tool, said window having an abutment surface; and
    a deformable elongated member having a first end fixed to said guard and a second end that is free to move with respect to said first end due to the deformable nature of said elongated member;
    wherein said elongated member has a first position wherein said second end is disposed adjacent said window abutment surface to prevent opening of said window, said deformable member being in a generally linear configuration when in its first position such that attempted opening forces are transferred along the axis of said elongated member, and wherein said elongated member has a second position wherein said elongated member is deformed by an operator so that said abutment surface and said second end are no longer disposed adjacent one another so that said window can be moved to an open position.

2. The power tool of claim 1 wherein said elongated member is a coilspring.

3. The power tool of claim 1 wherein said elongated member is disposed in a slot so as to restrict movement of said elongated member to one direction from its linear configuration.

4. The power tool of claim 1 wherein said window includes a relief area formed on one side of said abutment surface, said relief area receiving said elongated member second end when said elongated member is in its second position so as to allow opening of said window.

5. The power tool of claim 4 wherein said window further includes a camming surface which engages said second end when said window moves to its closed position to reposition said second end adjacent said abutment surface.

6. The power tool of claim 1 wherein said guard includes an actuating slot which allows a power tool operator access to said elongated member such that the operator can deform said elongated member to its second position to allow opening of said window.

7. A hand-held circular saw comprising:
    a motor having a saw blade coupled therewith;
    a guard for covering at least a portion of said saw blade;
    a window pivotally mounted to said guard and movable between an open position and a closed position, said window having an abutment surface and a relief area located adjacent said abutment surface; and
    a deformable elongated member having a first end fixed to said guard and a second end that is free to move with respect to said first end due to the deformable nature of said elongated member;
    wherein said elongated member has a first position wherein said second end is disposed adjacent said window abutment surface to substantially prevent opening of said window, and wherein said elongated member has a second position wherein said elongated member is deformed by an operator so that said first abutment surface and said second end are no longer disposed adjacent one another, and wherein said second end is positioned in said relief area so that said window can be moved to an open position.

8. The circular saw of claim 7 wherein said elongated member is in a generally linear configuration when in its first position such that attempted opening forces are transferred along the axis of the elongated member.

9. The circular saw of claim 7 wherein said elongated member is a coilspring.

10. The circular saw of claim 7 wherein said elongated member is disposed in a slot so as to restrict movement of said elongated member to one direction.

11. The circular saw of claim 7 wherein said window further includes a camming surface which engages said second end when said window moves to its closed position to reposition said second end adjacent said abutment surface.

12. The circular saw of claim 7 wherein said body includes an actuating slot which allows a power tool operator access to said elongated member such that the operator can deform said elongated member to its second position to allow opening of said window.

13. A hand-held circular saw comprising:

a motor having a saw blade coupled therewith;

a guard for covering at least a portion of said saw blade;

a window pivotally mounted to said guard and movable between an open position and a closed position, said window having an abutment surface and a relief area located adjacent said abutment surface, said abutment surface and said relief area being separated by a camming surface, said window being biased toward its closed position; and a deformable elongated member having a first end fixed to said guard and a second end that is free to move with respect to said first end due to the deformable nature of said elongated member;

wherein said elongated member has a first nondeformed position wherein said second end is disposed adjacent said window abutment surface to substantially prevent opening of said window; wherein said elongated member has a second position wherein said elongated member is deformed by an operator so that said abutment surface and said second end are no longer located adjacent one another and wherein said second end is positioned in said relief area so that said window can be moved to an open position; and wherein said elongated member automatically returns to its first nondeformed position by said second end engaging said camming surface when said window returns to its closed position.

14. The circular saw of claim 13 wherein said elongated member is in a generally linear configuration when in its first position such that attempted opening forces are transferred along the axis of the elongated member.

15. The circular saw of claim 13 wherein said elongated member is a coilspring.

16. The circular saw of claim 13 wherein said elongated member is disposed in a slot so as to restrict movement of said elongated member to one direction.

17. The circular saw of claim 13 wherein said body includes an actuating slot which allows a power tool operator access to said elongated member such that the operator can deform said elongated member to its second position to allow opening of said window.

* * * * *